(12) United States Patent
Yeakle

(10) Patent No.: US 11,297,827 B2
(45) Date of Patent: Apr. 12, 2022

(54) DEVICE FOR REDUCING GROUND MOLE TUNNELING

(71) Applicant: Rollin Yeakle, Midland, MI (US)

(72) Inventor: Rollin Yeakle, Midland, MI (US)

( * ) Notice: Subject to any disclaimer, the term of this patent is extended or adjusted under 35 U.S.C. 154(b) by 108 days.

(21) Appl. No.: 16/749,212

(22) Filed: Jan. 22, 2020

(65) Prior Publication Data
US 2021/0219541 A1    Jul. 22, 2021

(51) Int. Cl.
*A01M 99/00* (2006.01)
(52) U.S. Cl.
CPC .................................. *A01M 99/00* (2013.01)

(58) Field of Classification Search
CPC .. A01M 99/00; A01M 2200/00; A01M 17/00; A01M 27/00; A01B 1/243; A01B 45/02
See application file for complete search history.

(56) References Cited

U.S. PATENT DOCUMENTS

| 2,598,352 | A | * | 5/1952 | Cassell | A01M 17/00 43/124 |
|---|---|---|---|---|---|
| 2007/0256845 | A1 | * | 11/2007 | Catalano | A01B 1/243 172/21 |
| 2008/0128147 | A1 | * | 6/2008 | Lynch | A01B 1/243 172/349 |
| 2016/0330950 | A1 | * | 11/2016 | Preston | A01M 17/00 |

* cited by examiner

*Primary Examiner* — Richard G Davis

(57) ABSTRACT

A device for reducing ground mole tunneling.

20 Claims, 1 Drawing Sheet

DEVICE FOR REDUCING GROUND MOLE TUNNELING

BACKGROUND OF THE INVENTION

The applicant is unaware of any prior art in this field of invention.

THE INVENTION

The instant device is a device for reducing ground mole tunneling. The device comprises a wheel with a center hub. The hub contains an axle. There is a handle. The handle contains a double shaft at a near end. The shafts are secured on both ends of the axle. The wheel has an outer rim. The wheel contains a plurality of spiked protrusions through the outer rim. The spiked protrusions have a distance between them ranging from ½ inch to 2 inches. The spiked protrusions have a length of from ¾ inch to 3 inches.

The shafts have a length in the range of from 1 foot to 3.5 feet. The wheel can be manufactured from plastic where the plastic can be selected from polyethylene, polypropylene, or crosslinked polyethylene. In the alternative, the wheel can be manufactured from metal wherein the metal can be aluminum, iron, or steel. The wheel can be manufactured from wood. The device has a diameter of the wheel ranging from 3 inches to 24 inches and the handle is manufactured from metal chosen from aluminum, iron, or steel.

The instant invention contains spiked protrusions that are manufactured from a group selected from metal, wood, plastic a combination of metal components and wood components, a combination of metal components and plastic components, and, a combination of plastic components and wood components.

DETAILED DESCRIPTION OF THE DRAWINGS

Figure 1:
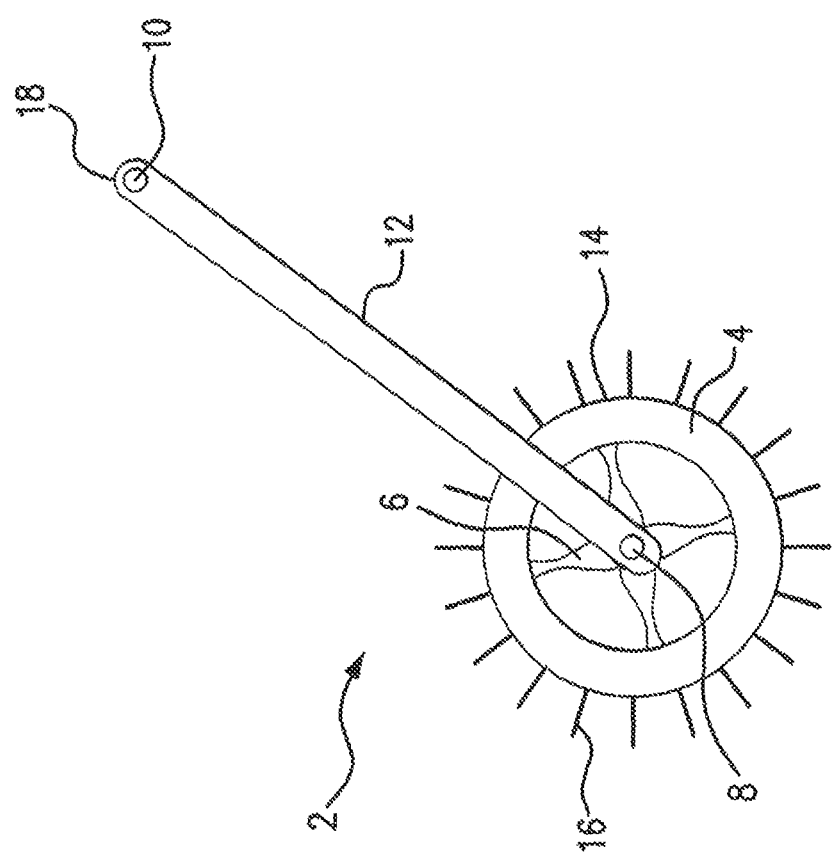
FIG. 1 is a full side view of the device of this invention.

FIG. 1 shows a side view of the device 2 for reducing ground mole tunneling. The device 2 comprises a wheel 4 with a center hub 6. The hub 6 contains an axle 8. There is a handle 10. The handle 10 contains a double shaft 12 at a near end 19. The shafts 12 are secured at each end of the axle 8. The wheel 4 has an outer rim 14. The wheel 4 contains a plurality of spiked protrusions 16 through the outer rim 14. The spiked protrusions 16 have a distance between them ranging from ½ inch to 2 inches. The spiked protrusions 16 have a length of from ¾ inch to 3 inches.

The handle 10 has a length in the range of from 1 foot to 3.5 feet including the shafts 12. The wheel 4 is manufactured from plastic selected from polyethylene, polypropylene, and crosslinked polyethylene.

Figure 2:
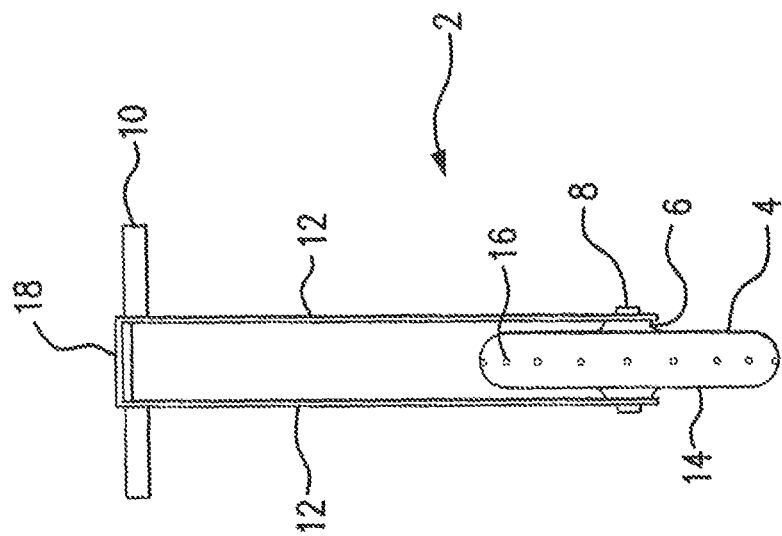
FIG. 2 is a full front view of the device of FIG. 1.

FIG. 2 is a full front view of the device 2 of this invention. Shown in this Figure is the wheel 4 with a center hub 6. The hub 6 contains an axle 8. There is a handle 10. The handle 10 contains a double shaft 12 at a near end 19. The shafts 12 are secured on both ends of the axle 8. The wheel 4 has an outer rim 14. The wheel 4 contains a plurality of spiked protrusions 16 through the outer rim 14. The spiked protrusions 16 have a distance between them ranging from ½ inch to 2 inches. The spiked protrusions 16 have a length of from ¾ inch to 3 inches.

It has been discovered that by aligning the device 2 with an existing ground mole tunnel and manually propelling the device 2 along the ground mole tunnel the spiked protrusion 16 will penetrate the ground and will come into contact with a ground mole thus impaling it. It has also been discovered that continued use of the device in the manner described above will eliminate the ground mole and result in the reduction and elimination of ground mole tunnels and tunneling.

It has also been discovered that the use of the device 2 in the manner described previously will eliminate ground moles in an environmentally friendly manner without the use of harmful chemicals, poisons, or dangerous traps.

What is claimed is:

1. A device for reducing ground mole tunneling, said device consisting of:
    a wheel with a center hub, said hub containing an axle;
    a handle, said handle containing a double shaft at a near end, said handle being secured on both ends of said axle;
    said wheel having an outer rim, said wheel containing a single line of spiked protrusions through said outer rim;
    said spiked protrusions having an equal distance between them ranging from ½ inch to 2 inches;
    said spiked protrusions having a length of from ¾ inch to 2 inches measured from the outer circumference of said wheel.
2. A device as claimed in claim 1 wherein the handle has a length in the range of from 1 foot to 3.5 feet.
3. A device as claimed in claim 1 wherein the wheel is manufactured from plastic.
4. A device as claimed in claim 3 wherein the plastic is polyethylene.
5. A device as claimed in claim 3 wherein the plastic is polypropylene.
6. A device as claimed in claim 3 wherein the plastic is crosslinked polyethylene.
7. A device as claimed in claim 1 wherein the wheel is manufactured from metal.
8. A device as claimed in claim 7 wherein the metal is aluminum.
9. A device as claimed in claim 7 wherein the metal is iron.
10. A device as claimed in claim 7 wherein the metal is steel.
11. A device as claimed in claim 1 wherein the wheel is manufactured from wood.
12. A device as claimed in claim 1 wherein the diameter of the wheel ranges from 3 inches to 24 inches.
13. A device as claimed in claim 1 wherein the handle is manufactured from metal.
14. A device as claimed in claim 13 wherein the metal is aluminum.
15. A device as claimed in claim 13 wherein the metal iron.
16. A device as claimed in claim 13 wherein the metal is steel.
17. A device as claimed in claim 1 wherein the handle is manufactured from wood.
18. A device as claimed in claim 1 wherein the handle is manufactured from a combination of wood parts and metal parts.
19. A device as claimed in claim 1 wherein the handle is manufactured from plastic.
20. A device as claimed in claim 1 wherein the spiked protrusions are manufactured from a group selected from:
    i. metal, ii. wood,
iii. plastic
iv. a combination of metal components and wood components,
v. a combination of metal components and plastic components, and,
vi. a combination of plastic components and wood components.

\* \* \* \* \*